United States Patent Office 3,161,628
Patented Dec. 15, 1964

3,161,628
PROCESS FOR POLYMERIZING OLEFINS IN THE PRESENCE OF A "ZIEGLER TYPE" CATALYST TREATED WITH SULFURIC OR PHOSPHORIC ACID
Nicolaas Dost and Franciscus Johannes Fredericus van der Plas, Amsterdam, Netherlands, and Norman Entwistle, Timperley, England, assignors to Shell Oil Company, a corporation of Delaware
No Drawing. Filed Apr. 30, 1957, Ser. No. 655,944
Claims priority, application Great Britain, Aug. 2, 1956, 23,907/56
1 Claim. (Cl. 260—94.9)

This invention relates to improved methods for the polymerization of alpha-olefins. More particularly, it relates to improved methods for the polymerization of alpha-olefins whereby products of controlled molecular weights are obtained.

It is now well known that polymers of alpha-olefins may be prepared at low temperatures and pressures in the presence of certain catalyst compositions. Such processes are conducted at temperatures ranging from about ambient temperatures to about 120° C. and pressures below 500 p.s.i. The catalysts are designated in the art generally as "Ziegler catalysts" or "low pressure catalysts." Such catalysts are capable of polymerizing alpha-olefins, as ethylene, butene-1, propene, styrene and other alpha-olefins.

The processes of the present invention relate to improved methods of producing polyethylene, polypropylene, polystyrene, and other polymers of alpha-olefins. It also relates to the polymerization of mixtures of such olefins to produce copolymers. As the technology as it relates to the polymerization of alpha-olefins by the use of low pressure catalysts is substantially the same, this invention will be described as it relates to the production of certain homopolymers but it will be readily understood that the invention is of general application to the polymerization of alpha-olefins and copolymers thereof using the "low pressure catalysts."

As indicated above, the catalysts which are utilized in processes of this invention are the so-called "low pressure catalysts." They may be selected from A through E as follows:

A. The reaction product of (1) a compound of a metal selected from Groups IV, V, VI and VIII of the Mendeléeff Periodic Table and manganese with (2) a compound of the formula $R_1R_2AlX$ wherein $R_1$ and $R_2$ each are selected from the group consisting of hydrogen and hydrocarbon and X is selected from the group consisting of hydrogen, halogen, alkoxy, aryloxy, the residue of a secondary amine, amide, mercaptan thiophenol, carboxylic acid and sulfonic acid, B. The reaction product of (1) a compound of a metal from Groups IV, V, VI and VIII of the Mendeléeff Periodic Table and manganese with (2) a compound selected from the group consisting of aluminum trialkyl, magnesium alkyl, zinc alkyl and Grignard compound, C. A composition comprising aluminum trichloride, titanium tetrachloride, and aluminum, D. Chromium oxide on alumina, and E. An oxide of a metal from Group VI of the Mendeléeff Periodic Table.

It is known that in the polymerization of olefins, as ethylene, the molecular weight of the polymer produced may be varied according to the ratio of the catalyst-forming components employed to form the catalyst mixture. Thus, when an aluminum alkyl, or aluminum alkyl halide, is used with titanium tetrachloride, the molecular weight of the polymer increases with an increasing molar ratio of aluminum to titanium. There are, however, reasons connected with the yield and the rate of reaction why this effect cannot be used to obtain molecular weights as low as is sometimes desirable. The problem of controlling molecular weight also arises when using highly purified olefins and solvent.

It is an object of this invention to provide improved methods for the polymerization of alpha-olefins whereby the molecular weight of the product can be controlled. It is another object of this invention to provide improved methods for the polymerization of alpha olefins, particularly ethylene, at low temperatures and pressures, using the so-called "low pressure catalysts" whereby the molecular weight of the product may be controlled. Other objects will become apparent as the description proceeds.

These and other objects are accomplished in the method for the polymerization of alpha-olefins at low temperatures and pressures in the presence of a low pressure catalyst by the improvement which comprises conducting the polymerization in the presence of a compound having an active hydrogen atom selected from the group consisting of alcohols, phenols, thioalcohols, thiophenols, organic acids, organic thioacids and inorganic acids.

From the foregoing it will be seen that the compounds which will operate to control the molecular weight by the methods of this invention have in common at least one hydrogen atom which can be substituted in a reaction between the particular compound and a metal or a metal salt. For the sake of brevity, such compounds will be referred to hereafter as "hydrogen-active." The improvement of the present invention will be found to be suitable wherever an organic compound has an —OH group or the corresponding sulfur derivative, i.e. thiols or mercaptans. As representative examples of compounds having —OH groups there is included the alcohols such as methanol, propanol, butanol, n-octanol, and the like, phenol, alkylated phenols and the like, and the corresponding thio compounds. In a preferred embodiment alcohols having up to 9 carbon atoms in the molecule are of particular advantage as they exhibit the property of reducing polymer deposits upon the inner-surfaces of the reaction vessel. In addition to the hydroxy-containing compounds, and the corresponding thio compounds, this invention applies equally where the —OH group appears as in organic acids such as formic acid, acetic acid, butyric acid, stearic acid, and the like. In addition to the corresponding thio derivatives of the alcohols, as indicated above, there may be employed the corresponding thio acids such as thioacetic acid, thiopropionic acid, thiostearic acid, and the like. In addition to organic acids it is found that mineral acids are also suitable for the processes of this invention. Such acids include hydrochloric, sulfuric, phosphoric, pyrophosphoric, hypophosphoric, boric, and the like.

The processes of this invention permit control of the molecular weight of the polymer either to adjust the molecular weight upwards or downwards. This control is obtained by selection of a particular compound of the type described above. It will be found that the use of the sulfur containing compounds, i.e., the thiols or mercaptans, will act to increase the molecular weight whereas the hydroxy containing compounds and the organic and inorganic acids will act to decrease the molecular weight.

The quantity of the hydrogen-active compound to be used will vary depending upon the molecular weight of the product which is desired. Lesser amounts will have a less pronounced effect while greater amounts will show a correspondingly greater change in the molecular weight. However, in general, only relatively small amounts are required, e.g. below 1% by weight of the olefin feed. It is very convenient and preferred to supply these compounds to the polymerization reaction by including them in the olefin feed. Alternatively the hydrogen-active compound may be supplied continuously to the polymerization reaction as a separate feed but the small quantities required sometimes make it difficult to maintain a uniform rate of supply when operating in this manner.

Although it is possible to use for the purposes of the present invention a technical grade olefin containing the normal impurities, it is generally preferred to use a fairly pure olefin feed. Also it is preferred to use catalyst-forming components which are of high purity as well as optional components, such as the hydrocarbon or halohydrocarbon solvent which is also relatively free of impurities. Thus, it is desirable to use an olefin which is as free as is practical from other unsaturated hydrocarbons, and broadly speaking, any non-hydrocarbon organic compounds with the exception of saturated halohydrocarbons. The same consideration applies broadly to the optional components of the reaction mixture such as the organic solvents. Halohydrocarbons may be used as the solvent but consideration must then be given to the purity thereof. The quantity of impurity in the feed, exclusive of hydrogen and saturated hydrocarbons, should be reduced to less than 30 p.p.m. by weight of the olefin feed.

The purification of the olefin and the solvent may be carried out by any method. One such method comprises treatment with sulfuric acid (using dilute acid to treat the olefin and more concentrated acid to treat the solvent) and then distilling over calcium hydride. Treatment with ammoniacal cuprous chloride or hydrogenation may be employed to eliminate acetylene, which is often present in commercial ethylene.

In certain cases a compound or compounds having an active hydrogen atom in the molecule may be present as an impurity in the olefin or in some other constituent of the reaction mixture, as for example, in the solvent. In such cases the impurity may be present in an amount ranging from .001 to 10 molar percent, and preferably between .002 and 1 mole, of the amount of olefin polymerized under the reaction conditions. This is illustrated by the presence of acetylene in commercial ethylene. In most instances it will be found that polymerization mixtures used in the low pressure methods of polymerization do not contain sufficient hydrogen-active compounds and it is accordingly necessary to adjust the content of hydrogen-active compound to the amount indicated. This is generally achieved most conveniently by first removing substantially all of the hydrogen-active compound, or compounds, from the olefin or other component of the reaction medium and then adding the desired amount.

In connection with the olefin feed, it should be noted that when the olefin is passed as a gas through the reaction mixture only a proportion of that gas takes part in the polymerization reaction and so only a proportion of any hydrogen-active compound in the gaseous olefin may be effective. The amount of hydrogen-active compound required is also dependent to some extent on the nature of the catalyst-forming components employed and their relative molar proportions as well as the reaction conditions in general. Therefore, when applying the process of the present invention to any given olefin polymerization, an initial trial is necessary to ascertain the optimum amount of hydrogen-active compound to be used. The amount of polymer formed without the hydrogen-active compound is taken as a standard. Thereafter polymerization is carried out with say .002 molar percent of a hydrogen-active compound based on the molar quantity of olefin represented by the known amount of polymer formed. The presence of the hydrogen-active compound will probably decrease the yield of polymer slightly, and this factor may have to be considered when calculating the amount of hydrogen-active compound to be used in subsequent runs. The nature of the hydrogen-active compound itself will also have an influence on the amount thereof which is to be used.

When polymerization is carried out in the liquid phase using, for example, aluminum diethyl monochloride and titanium tetrachloride as catalyst-forming components, each component being present to the extent of 2 to 20 and preferably 5 millimols per liter of solvent (i.e. a molar ratio of Al:Ti about 1:1) the amount of hydrogen-active compound is preferably between 0.05 to 2.0 millimols per mol of aluminum or titanium.

The processes of this invention are described more fully in the following examples.

EXAMPLE I

A number of runs in which ethylene is polymerized by the low-pressure process is carried out as follows:

300 milliliters of purified isooctane are placed in a reaction vessel and titanium tetrachloride in an amount of 5 millimols per liter of isooctane is then added followed by the addition of the same molar amount of aluminum diethyl monochloride. The mixture is stirred for 20 minutes at 40° C. to permit formation of the catalyst which has an aluminum/titanium ratio of 1:1. The system is maintained at 40° C. and polymerization is effected by passing a stream of purified ethylene through the catalyst suspension to which methanol is also added either in bulk or continuously throughout the polymerization, as the case may be. On completion of polymerization the polymer is removed from the resulting slurried reaction mixture and purified from catalyst remnants. The intrinsic viscosity (I.V.) of the resulting polymer is then determined in the usual way. The amount of methanol added and the I.V. of the resulting polymeric products are indicated in Table 1.

Table 1

| Amount of Methanol Added (Millimols) During Reaction | Yield of Polymer, Grams | I.V. of Polymer |
| --- | --- | --- |
| Bulk Addition: | | |
| 0 | 45 | 4 |
| 0.06 | 41 | 3.9 |
| 0.36 | 39 | 3.1 |
| 0.72 | 44 | 2.9 |
| Continuous Addition: | | |
| 0.08 | 32 | 3.7 |
| 0.53 | 29 | 2.8 |
| 0.86 | 20 | 1.6 |

In all cases the isooctane and the ethylene are treated with sulfuric acid and distilled over calcium hydride as indicated previously to remove unsaturated hydrocarbons other than ethylene and organic compounds other than hydrocarbons.

EXAMPLE II

Ethylene which is purified as indicated in Example I is polymerized under steady state conditions in the presence of either methanol or n-octanol and in contact with a low pressure catalyst obtained by mixing titanium tetrachloride and aluminum diethyl-monochloride in isooctane to give an Al/Ti ratio of 1:1 and an initial aluminum and titanium pro-catalyst concentration of 5 millimols (of each compound) per liter of isooctane. The reaction mixture is maintained at 50° C. and a number of runs each of 50 hours duration are carried out. The polymer is run off continuously from the resulting slurried reaction mixture and purified from catalyst remnants. The intrinsic viscosity (I.V.) of the resulting polymer is then determined in the usual way. The amounts of alcohol added and the I.V. of the resulting polymers are indicated in Table 2.

Table 2

| Yield in g./g. TiCl₄ | Alcohol Added | Amount of Alcohol Added (p.p.m. by wt. in the solvent) | I.V. of Polymer Obtained |
| --- | --- | --- | --- |
| 150 |  | 0 | 5.3 |
| 153 | Methanol | 40 | 3.7 |
| 144 | do | 100 | 3.4 |
| 90 | do | 150 | 2.5 |
| 98 | n-Octanol | 400 | 2.9 |

EXAMPLE III

A series of batch polymerizations are carried out in which the catalyst is prepared from equimolar amounts (100 millimols/liter of solvent) of aluminum diethyl monochloride and titanium tetrachloride which are mixed in 15 milliliters of isooctane at 40° C. for 20 minutes in the presence of .5 gram of preformed polyethylene. Isooctane is then added to bring the volume up to 300 milliliters and varying amounts of dodecylmercaptan (DDM) are added. Highly purified ethylene containing 1 p.p.m. of acetylene and 15 p.p.m. of oxygen is then bubbled through the isooctane solution and/or suspension of catalyst.

The results are summarized in the following Table 3.

Table 3

| DDM Added in mmols/liter of Isooctane | Yield After 2 Hours | I.V. |
|---|---|---|
| 0 | About 27 grams | 4 |
| 1.6 | About 32 grams | 5.0 |
| 3.2 | About 26 grams | 6.0 |

EXAMPLE IV

A series of polymerizations are carried out in the same way as in Example III, except that anhydrous hydrochloric acid is added with the ethylene stream. The results are summarized in the Table 4.

Table 4

| Total Amount of HCl Introduced via the Ethylene Stream, mmols | Yield in g. | Yield in g./g.TiCl$_4$ | I.V. | Bulk Density |
|---|---|---|---|---|
| 0 | 27 | 92 | 4 | 0.13 |
| 1.1 | 27 | 95 | 2.2 | 0.18 |
| 1.8 | 23 | 81 | 3.0 | 0.17 |

EXAMPLE V

A series of polymerizations are carried out in the same way as in Example IV, but with acetic acid in various quantities present in the reaction mixture. The results are summarized in Table 5.

Table 5

| Acetic Acid Added in mmols | Yield in g. | Yield in g./g. TiCl$_4$ | I.V. |
|---|---|---|---|
| 0 | 27 | 88 | 4 |
| 0.5 | 23 | 81 | 2.9 |
| 1.0 | 29 | 102 | 2.5 |
| 1.5 | 28 | 98 | 1.9 |
| 2.0 | 5 | 18 | 1.8 |

Similar results are obtained in other examples using phosphoric acid, propionic acid, thiobutyric acid, thiocresol, and the like. Similar results will be obtained using catalyst components other than those described in the examples such as aluminum trialkyls, aluminum alkoxides and other low pressure catalyst components.

From the foregoing it will be readily appreciated that the processes of this invention are capable of numerous modifications. Thus, for example, if desired, two or more hydrogen-active compounds of the type described above may be used together or if desired a single compound having more than one of the active hydrogen atoms of the type described above may be used. This is represented for example by organic hydroxy acids. In another embodiment, the processes of this invention may be used to good advantage where, for example, a lower alcohol is used for the purpose of minimizing the formation of undesirable polymer deposits on the walls of the reaction vessel, and concurrently therewith a thiol of the type described is used in order to offset the lower molecular weight of the polymer which would be obtained if the alcohol were used by itself. In this way the reduction of undesirable deposits on the walls of the reaction vessel is obtained without substantial alteration of the molecular weight of the polymer product.

In another modification of the present invention batch or continuous operations may be employed and it will be seen that continuous operation offers more than one feed stream to which the hyrdogen-active compound may be continuously fed. In batch operations the hydrogen-active compound may be added to the catalyst mixture or to one of the optional components of the reaction before polymerization starts. In still another embodiment of the invention it may be useful to add a compound, or compounds, of the class described above at a varying rate or intermittently during the course of the polymerization. This technique may be employed with advantage by adding a compound which reduces the molecular weight of the polymer towards the end of the polymerization reaction whereby the tendency for the molecular weight of the polymer to increase during this period is reduced or minimized.

This invention will be seen to be operative irrespective of the numerous techniques which may be employed in low pressure polymerization. Thus, for example, if desired the polymerizations of this invention may be conducted while the catalyst is supported on a carrier and if desired the catalyst may be introduced intermittently. Further, the processes of this invention also applies in the polymerization of styrene, propylene, butene-1 and other alpha-olefins and mixtures thereof.

We claim as our invention:

In the polymerization of ethylene with a catalyst prepared by the interaction of (a) an aluminum compound of the general formula $R_2AlX$ wherein R is an alkyl radical and X is selected from the group consisting of halogen and alkyl radicals, with (b) a metal halide, $MeX_n$ in which Me represents a metal of the B subgroup of Group IV, X represents halogen and n represents the valence of the metal, the improvement which comprises directly treating the catalyst prior to polymerization, with inorganic acid selected from the group consisting of sulfuric acid and phosphoric acid in an amount such as to cause production of a lower molecular weight polyethylene.

References Cited by the Examiner

UNITED STATES PATENTS

| | | | |
|---|---|---|---|
| 2,839,518 | 6/58 | Brebner | 260—94.9 |
| 2,843,577 | 7/58 | Friedlander et al. | 260—94.9 |
| 2,865,903 | 12/58 | Seed | 260—94.9 |
| 2,886,561 | 5/59 | Reynolds et al. | 260—94.9 |
| 2,965,626 | 12/60 | Pilar et al. | 260—94.9 |
| 2,965,627 | 12/60 | Field et al. | 260—94.9 |

FOREIGN PATENTS

| | | |
|---|---|---|
| 533,362 | 5/55 | Belgium. |
| 534,792 | 1/55 | Belgium. |
| 534,888 | 1/55 | Belgium. |
| 538,782 | 12/55 | Belgium. |

OTHER REFERENCES

Schmidt et al.: Principles of High Polymer Theory and Practice, McGraw-Hill, N.Y. (1948), page 126.

Schildknecht: "Vinyl and Related Polymers," John Wiley and Sons, N.Y. (1952), pages 15 and 505.

Whitby: "Synthetic Rubber," John Wiley and Sons, N.Y. (1954), pages 252–57.

Renfrew et al.: "Polythene," Iliffe and Sons, London (1957), pages 28–30, and 40.

JOSEPH L. SCHOFER, Primary Examiner.

A. M. BOETTCHER, P. E. LANHAM, M. LIEBMAN, L. H. GASTON, J. R. LIBERMAN, WILLIAM H. SHORT, Examiners.